(12) United States Patent
Lakamraju et al.

(10) Patent No.: US 11,532,190 B2
(45) Date of Patent: Dec. 20, 2022

(54) ENERGY EFFICIENT SECURE WI-FI CREDENTIALING FOR ACCESS CONTROL SYSTEMS

(71) Applicant: Carrier Corporation, Palm Beach Gardens, FL (US)

(72) Inventors: Vijaya Ramaraju Lakamraju, Avon, CT (US); Haifeng Zhu, Vernon, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 484 days.

(21) Appl. No.: 16/333,060

(22) PCT Filed: Aug. 31, 2017

(86) PCT No.: PCT/US2017/047280
§ 371 (c)(1),
(2) Date: Mar. 13, 2019

(87) PCT Pub. No.: WO2018/052638
PCT Pub. Date: Mar. 22, 2018

(65) Prior Publication Data
US 2019/0251768 A1    Aug. 15, 2019

Related U.S. Application Data

(60) Provisional application No. 62/394,443, filed on Sep. 14, 2016.

(51) Int. Cl.
*G07C 9/00* (2020.01)
*H04W 12/08* (2021.01)
(Continued)

(52) U.S. Cl.
CPC ..... *G07C 9/00309* (2013.01); *G07C 9/00571* (2013.01); *G07C 9/00904* (2013.01);
(Continued)

(58) Field of Classification Search
None
See application file for complete search history.

(56) References Cited

U.S. PATENT DOCUMENTS 9,036,169 B2    5/2015    Park et al.
9,185,648 B2    11/2015   Miryala et al.
(Continued)

FOREIGN PATENT DOCUMENTS

CN    202183765 U    4/2012
WO    2013147917 A1   10/2013
(Continued)

OTHER PUBLICATIONS

<Http://www.Inventeksys.Com/Wp-Content/Uploads/Eswifi-An20052-Access-Point-R3.2.Pdf
(Continued)

*Primary Examiner* — Daniell L Negron
(74) *Attorney, Agent, or Firm* — Bachman & LaPointe, P.C.

(57) ABSTRACT

An access control system includes an energy efficient access control that operates as a Wi-Fi access point that broadcasts a Service Set Identifier (SSID) as indicator of access control level to communicate with a mobile device with WPA2 PSK.

2 Claims, 3 Drawing Sheets

(51) Int. Cl.
*H04W 52/02* (2009.01)
*H04W 12/069* (2021.01)
*H04W 84/12* (2009.01)

(52) U.S. Cl.
CPC ......... *H04W 12/069* (2021.01); *H04W 12/08* (2013.01); *H04W 52/0254* (2013.01); *G07C 2009/00404* (2013.01); *G07C 2009/00769* (2013.01); *H04W 84/12* (2013.01); *Y02D 30/70* (2020.08)

(56) References Cited

U.S. PATENT DOCUMENTS

| | | | |
|---|---|---|---|
| 9,483,887 B1 * | 11/2016 | Soleimani | G07C 9/00007 |
| 9,485,795 B2 | 11/2016 | Barathalwar | |
| 2009/0006635 A1 * | 1/2009 | Siegmund | H04L 29/12028 709/228 |
| 2009/0227282 A1 | 9/2009 | Miyabayashi et al. | |
| 2014/0003286 A1 | 1/2014 | Estevez et al. | |
| 2014/0059351 A1 | 2/2014 | Braskich et al. | |
| 2014/0068719 A1 | 3/2014 | Kiukkonen et al. | |
| 2014/0075523 A1 | 3/2014 | Tuomaala et al. | |
| 2014/0254575 A1 | 9/2014 | Venkatraman et al. | |
| 2014/0254577 A1 | 9/2014 | Wright et al. | |
| 2014/0362991 A1 | 12/2014 | Ebrom | |
| 2015/0026779 A1 | 1/2015 | Ilsar et al. | |
| 2015/0085725 A1 | 3/2015 | Estevez et al. | |
| 2015/0163665 A1 | 6/2015 | Roberts et al. | |
| 2015/0237641 A1 | 8/2015 | Sahu et al. | |
| 2016/0316353 A1 | 10/2016 | Kawakami et al. | |

FOREIGN PATENT DOCUMENTS

| | | |
|---|---|---|
| WO | 2015092970 A1 | 6/2015 |
| WO | 2015092971 A1 | 6/2015 |

OTHER PUBLICATIONS

< http://download.intel.com/support/edison/sb/edison_wifi_331438001.pdf >

International Search Report for Patent Application PCT/US2017/047280 dated Nov. 7, 2017.

EP Office action dated Feb. 10, 2021 issued for corresponding European Patent Application No. 17772787.2.

* cited by examiner

ENERGY EFFICIENT SECURE WI-FI CREDENTIALING FOR ACCESS CONTROL SYSTEMS

BACKGROUND

The present disclosure relates generally to access control systems, and more particularly, to a system and a method of opening a lock via a Wi-Fi interface available in most mobile and smart phone devices as a mechanism to transfer credential information, thus supporting a wider cell phone market.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the card and permit or deny access based on the encoded access rights. Some methods of encoding access rights include sequencing where subsequent access rights have a sequence number that is greater than the prior access rights.

Some access control systems have utilized a device other than a physical key card to communicate with a lock, such as via audio tones from a mobile device, where there is also a separate method of indicating access rights that is different from the data on the key card. Such systems are partially effective in that a person can open the lock by either means. But because of the separate means for indicating access rights where the lock can not determine which access right was sequenced before the other access right, these systems do not allow use of the ubiquitous physical key card in conjunction with the mobile device. The advantage of using the virtual card data is that no synchronization is required between separate systems for indicating access rights, and the lock can have a unified audit trail.

SUMMARY

An access control system according to one disclosed non-limiting embodiment of the present disclosure can include an access control that operates as a Wi-Fi access point that broadcasts a Service Set Identifier (SSID) to communicate with a mobile device with WPA2.

A further embodiment of the present disclosure may include, wherein the Service Set Identifier (SSID) represents a different user access level, to reduce energy needed for sophisticated access control.

A further embodiment of the present disclosure may include, wherein the access control wakes up only periodically to save energy while achieving access control wakeup when mobile devices approaches the access control unit, that requires only WiFi without using NFC.

A further embodiment of the present disclosure may include, wherein the access control does not support DHCP and routing to save energy.

A further embodiment of the present disclosure may include, wherein the mobile device includes credentials authorized remotely.

A further embodiment of the present disclosure may include, wherein the credentials includes the Service Set Identifier (SSID) and a channel number.

A further embodiment of the present disclosure may include, wherein the access control is a door lock.

A method of managing an access control system, the method according to another disclosed non-limiting embodiment of the present disclosure can include operating an access control as a Wi-Fi access point.

A further embodiment of the present disclosure may include periodically broadcasting a Service Set Identifier (SSID) to communicate with a mobile device.

A further embodiment of the present disclosure may include communicating via WPA2 with PSK only to save energy.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
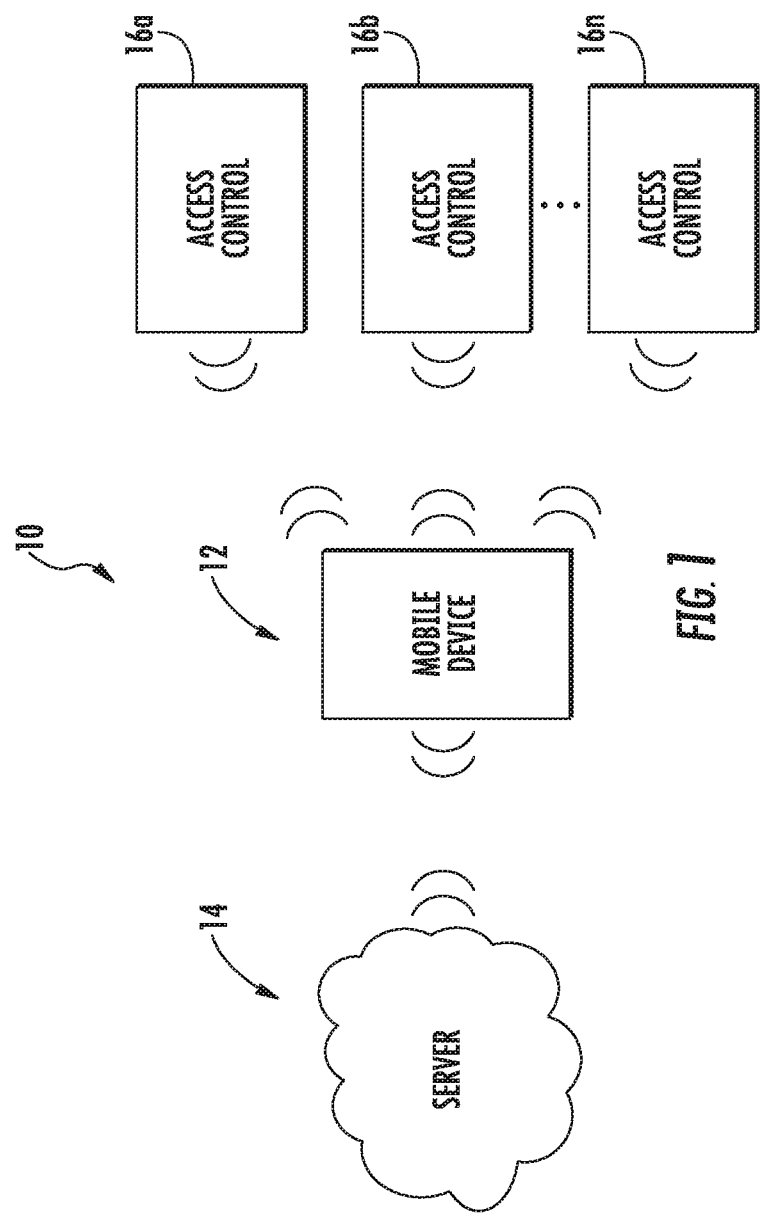
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software. It should be appreciated that there can be multiple mobile devices 12.

The mobile device 12 is a wireless capable handheld device such as a smartphone that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential.

A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
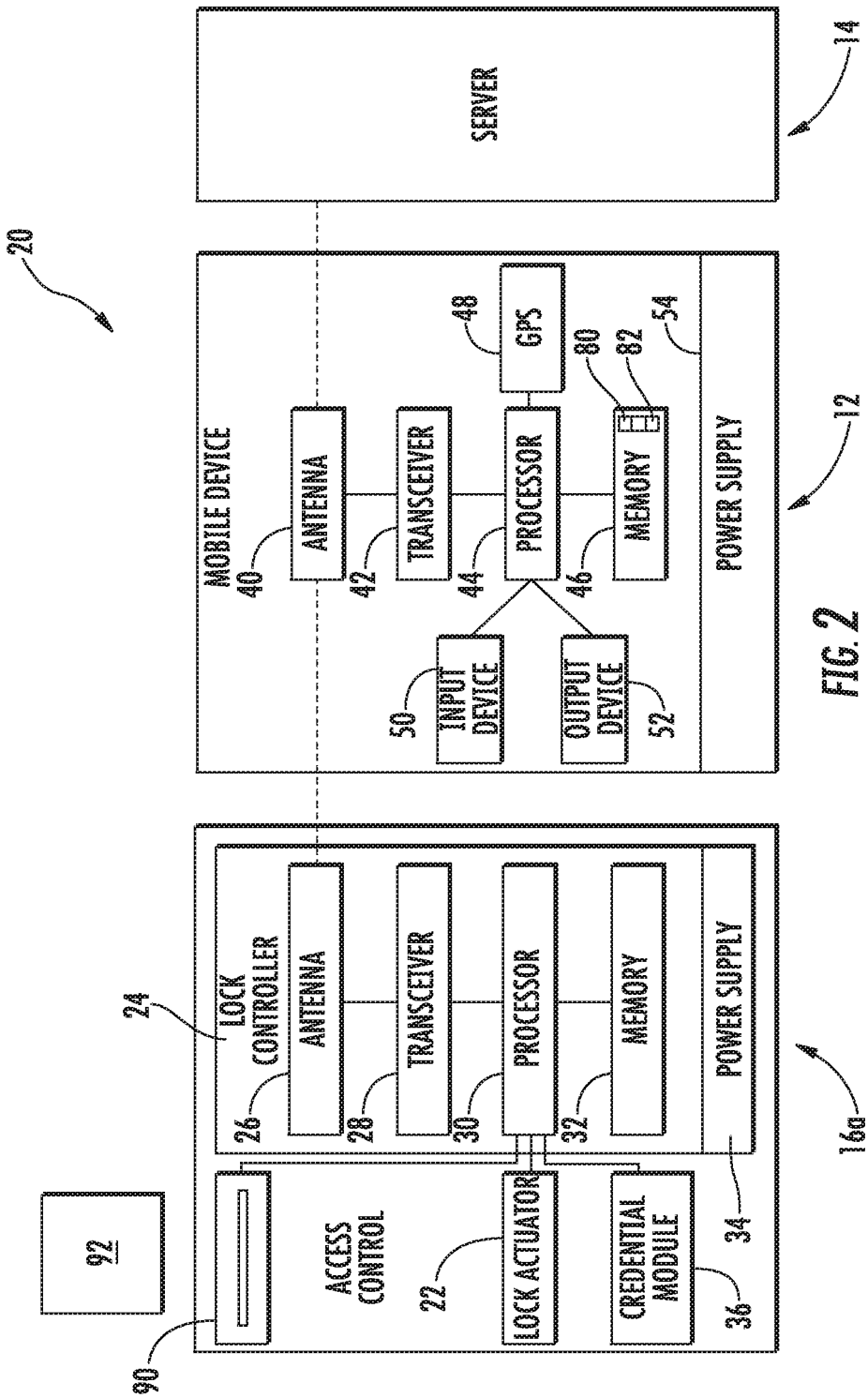
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. In this embodiment, the lock transceiver 28 operates as a soft-AP (Access Point) where DHCP and routing are intentionally disabled as a method of saving energy and reduce potential security weaknesses. This soft-AP broadcasts beacons with SSIDs that are specifically designed to support WiFi credentialing in this invention.

The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card reader." That is, the access control 16a can have two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
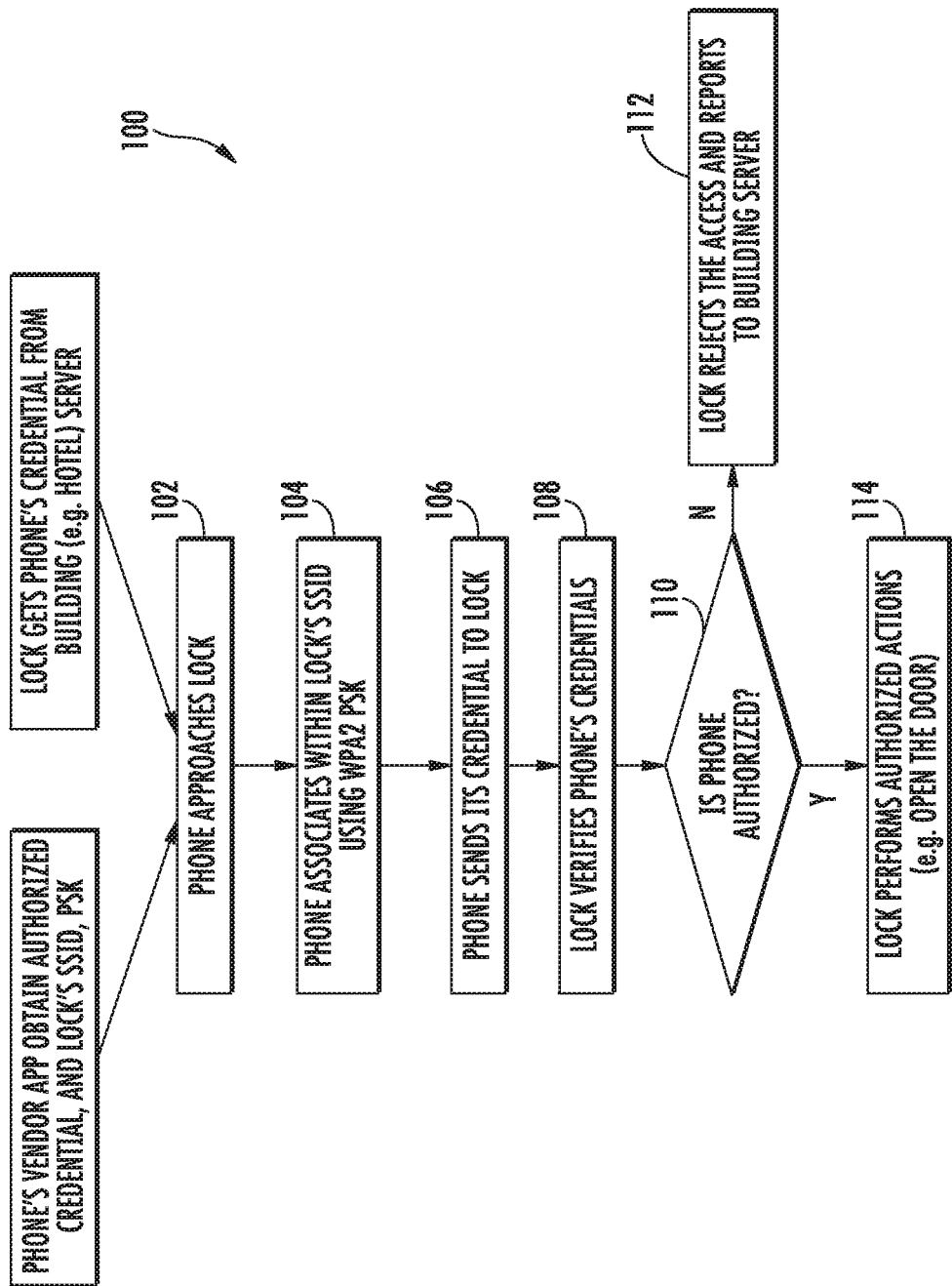
FIG. 3 is a flowchart of a Wi-Fi credentialing system.

With reference to FIG. 3, a method 100 to facilitate communication between the mobile device 12 and the access control 16a. The access control 16a operates as a soft-AP, periodically (e.g. every 5 seconds for example) broadcasts beacons with Service Set Identifier (SSID). The access control 16a may include different SSIDs and channel numbers represent different users access levels. This technique allows efficient representation of access control information that reduces the need of multiple packet transmission or device wakeups to save energy consumption of the access control 16a, which typically is battery-powered in many embodiments. The server 14, e.g., hotel server, may authorize the credentials on the mobile device 12. The credential contains the SSID and channel number to which the mobile device 12 should connect. The mobile device 12 sets up a Wi-Fi Protected Access 2 (WPA2) connection using Pre-Shared Key (PSK) with the access control 16a via the SSID and channel number in the credential, where PSK is given by the server 14 as part of the credentialing process. The use of PSK allows the reduction of energy consumption on access control 16a comparing with other mechanisms such as interacting with RADIUS authentication server in WPA2 enterprise mode.

Initially, as the mobile device 12 obtains credential from server 14. In a typical embodiment, the owner of the mobile device 12 reserves a hotel room online, and downloads an app from hotel's server 14 where a credential is given to the app. Such credential can include user's unique ID such as phone's unique ID, access level, and reservation information such as room number and duration of stay. The mobile device owner can then go to the hotel, bypassing the front desk, and open his or her room directly with the mobile device 12.

The mobile device 12 approaches the access control 16a (step 102), the mobile device 12 associates with the SSID of the access control 16a (step 104). The Wi-Fi AP functionality is awaken fully only when the mobile phone 12 comes close to the access control 16a and hence is not unnecessarily draining battery power. Such a function is achieved by a mechanism that only requires WiFi, which is available in all smart phones. The mechanism is to wake up the access control 16a periodically (for example every 5 seconds) with only the association function turned on which allows 16a to broadcast multiple SSIDs each represents a different access level. The wakeup period can be much longer than standard beacon broadcast period which typically is 102.4 millisecond, to save the energy of access control 16a.

Upon capturing the beacon from 16a, the mobile device connects to the access control 16a just as a normal AP with WPA2 information provided as part of the downloaded credential. The mobile device 12 communicates the credentials to the access control 16a (step 106) and the access control 16a verifies the credentials (step 108). Then the access control 16a verifies the credentials to determine if the mobile device 12 is authorized (step 110). If not authorized the access control 16a rejects access and reports to the server 14 (step 112). If authorized, the access control 16a provides access (step 114). The above process employs multiple mechanisms that allow significant reduction of energy consumption on access control 16a. This reduces the number of maintenance for battery changing in a fixed period. Such maintenance can be a significant cost for a large number of access control devices such as locks in a hotel building. In certain situations access control units can be installed in hard-to-reach areas, which further increase the cost of maintenance.

The method 100 facilitates a much larger cell phone market than the one that uses, for upcoming technology called Wi-Fi Direct. Wi-Fi Direct requires Wi-Fi Protected Setup (WPS) at a minimum and this is not supported by popular mobile platforms such as iPhones and iPads. Moreover, the high data speeds provided by Wi-Fi over technologies such as Bluetooth enables various kinds of applications such as advertisements and messaging on the mobile platform.

The method 100 provides an access control system that includes an access control that employs several mechanisms to allow energy efficient and secure authentication. An access control unit operates as a soft Wi-Fi access point that broadcasts a Service Set Identifier (SSID) that is utilized to represent access control level, and energy is saved by disabling DHCP and routing to allow extending battery lives of the access control units. When mobile device approaches the access control units, the access control units are waken up without the use of NFC. Its communication with a mobile device is achieved with WPA2 PSK without the use of WiFi-direct.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An access control system, comprising:
   a lock transceiver that operates as a Wi-Fi access point that broadcasts a Service Set Identifier (SSID) to communicate with a mobile device via Wi-Fi Protected Access 2 (WPA2) with a Pre-Shared Key (PSK) with the lock transceiver via the Service Set Identifier (SSID) and a channel number in the credential only to save energy, wherein each Service Set Identifier (SSID) represents one of a multiple of different user access levels, wherein the lock transceiver operates as a soft-AP (Access Point) where Dynamic Host Configuration Protocol (DHCP) and routing are intentionally disabled to save energy; and
   a mobile device that comprises credentials authorized remotely, the credentials comprise one of a multiple of Service Set Identifiers (SSID) and the channel number wherein the lock transceiver wakes up only periodically to save energy while achieving lock transceiver wakeup when the mobile devices approaches the lock transceiver which requires only WiFi without using near field communication (NFC).

2. A method of managing an access control system, the method comprising:
   operating a lock transceiver as a Wi-Fi access point that broadcasts a multiple of Service Set Identifiers (SSIDs) to communicate with a mobile device via Wi-Fi Protected Access 2 (WPA2), wherein each of the multiple of Service Set Identifiers (SSID) represents one of a multiple of different user access levels, wherein the lock transceiver operates as a soft-AP (Access Point) where Dynamic Host Configuration Protocol (DHCP) and routing are intentionally disabled to save energy;

periodically broadcasting the multiple of Service Set Identifiers (SSID) to communicate with a mobile device; and communicating via Wi-Fi Protected Access 2 (WPA2) with the Pre-Shared Key (PSK) with the lock transceiver via one of the multiple of the Service Set Identifier (SSID) and a channel number.

\* \* \* \* \*